United States Patent [19]

Hatakenaka et al.

[11] Patent Number: 5,605,588
[45] Date of Patent: Feb. 25, 1997

[54] STUDLESS TIRE

[75] Inventors: Kenji Hatakenaka; Kenichi Mineta, both of Hyogo; Akihiro Miyoshi, Okayama, all of Japan

[73] Assignee: Sumitomo Rubber Industries, Ltd., Hyogo, Japan

[21] Appl. No.: 261,113

[22] Filed: Jun. 14, 1994

[30] Foreign Application Priority Data

Jun. 14, 1993 [JP] Japan .................................. 5-165918
Jun. 24, 1993 [JP] Japan .................................. 5-175869

[51] Int. Cl.$^6$ .................................................. B60C 11/12
[52] U.S. Cl. ................................ 152/209 R; 152/DIG. 3
[58] Field of Search ........................... 152/209 R, 209 A, 152/209 D, 209 B, DIG. 3

[56] References Cited

U.S. PATENT DOCUMENTS

| | | | |
|---|---|---|---|
| 4,200,134 | 4/1980 | Takigawa et al. | 152/209 R |
| 4,606,389 | 8/1986 | Haas | 152/209 R |
| 5,027,875 | 7/1991 | Kogure | 152/209 R |
| 5,323,825 | 6/1994 | Yamagishi et al. | 152/209 R |
| 5,361,816 | 11/1994 | Hitzky | 152/209 R |
| 5,454,411 | 10/1995 | Weyrich et al. | 152/209 R |

FOREIGN PATENT DOCUMENTS

| | | | |
|---|---|---|---|
| 2080328 | 4/1993 | Canada | 152/209 D |
| 268709 | 11/1987 | Japan | 152/DIG. 3 |
| 309806 | 12/1989 | Japan | 152/209 D |
| 114006 | 4/1990 | Japan | 152/209 R |
| 139404 | 6/1991 | Japan | 152/209 R |
| 176712 | 6/1992 | Japan | 152/209 B |
| 262155 | 5/1964 | Netherlands | 152/209 R |

*Primary Examiner*—Steven D. Maki
*Attorney, Agent, or Firm*—Birch, Stewart, Kolasch & Birch, LLP

[57] ABSTRACT

A studless tire with a tread pattern comprising blocks that are defined by longitudinal and transverse grooves and having at least one row of blocks that extends in the peripheral direction of the tire. The peripheral rows of blocks are such that at least one sub-block is provided within one pitch of the tread pattern outside an adjacent block in the tire's rotating axle. And the sub-block is separated from the block by a sub-groove less deep than the longitudinal and transverse grooves and has the longer side in the peripheral direction and the shorter side in the direction of the rotating axle.

4 Claims, 6 Drawing Sheets

FIG. 10E CONVENTIONAL

STUDLESS TIRE

BACKGROUND OF THE INVENTION

The present invention relates to a studless tire that assures good running performance over snow- or ice-covered road surfaces without requiring studs on the tread surface.

The use of spiked tires with studs embedded in the tread has been popular on automobiles running on snow- or ice-covered road surfaces. However, in recent years an increasing number of local governments are banning the use of spiked tires because they cause the problem of wearing the surface of bare pavement with the protruding end of studs.

Under the circumstances, the use of studless tires which assure an improvement in the running performance over snow- or ice-covered road surfaces without providing studs on the tread surface is increasing. With such studless tires, their running performance on snow- or ice-covered road surfaces is improved by providing the tread with a block pattern consisting of a plurality of blocks, with a plurality of sipes being provided in each block.

However, the performance requirements for tires to possess include starting and accelerating performance, braking performance, cornering performance and hill climbing performance and it is necessary that a good balance be attained between these performance characteristics. With conventional studless tires, however, emphasis is placed on improvements in the braking performance on snow- or ice-covered road surfaces and they cannot be said to be completely satisfactory in other aspects such as cornering performance.

Furthermore, the conventional studless tires have had the problem that their running performance on highways in a bare condition is rather poor.

To insure better grip on snow and ice surfaces, the studless tires have ends of the tread formed in square shoulders but this causes unsteady running, or "wandering", in the ruts worn in wheel tracks.

Still a further problem with studless tires which are specially designed to maintain low temperatures is that they adopt tread rubber formulations having the tendency to provide lower grip on bare pavement. A vehicle with such tires installed on wheels will experience increased understeer when it corners.

With the recent increase in the number of local governments that ban the use of spiked tires, there is a growing need for the development of studless tires having better running performance on highways in a bare condition.

An object, therefore, of the present invention is to provide a studless tire that is improved in running performance, particularly cornering performance, on snow- or ice-covered road surfaces.

Another object of the present invention is to provide a studless tire that is improved in running performance not only on snow- or ice-covered road surfaces but also on highways in a bare condition.

SUMMARY OF THE INVENTION

The above-stated object of the invention can be attained by a studless tire with a tread pattern comprising blocks that are defined by longitudinal and transverse grooves and having at least one row of blocks that extends in the peripheral direction of the tire. The peripheral rows of blocks are such that at least one sub-block is provided within one pitch of the tread pattern outside an adjacent block in the tire's rotating axle. And the sub-block is separated from the block by a sub-groove less deep than the longitudinal and transverse grooves and has the longer side in the peripheral direction and the shorter side in the direction of the rotating axle.

Furthermore, in the studless tire according to the invention, any two sub-blocks that are formed on opposite sides of the center line through the area of contact with the ground and which are spaced by equal distances from the center line alternate in the peripheral direction.

Still further, the ratio of the land area L to the sea area S is set to lie within the range $L/S=(0.5–0.65)/(0.5–0.35)$.

Still further, the studless tire further satisfies the following conditions:

$m/M=0.025–0.050$ $a/c=0.055–0.15$ $d/D=0.40–0.80$ $0.2<e/T<0.8$ where M is the in-pitch land area within one pitch of the tread pattern; m is the surface area of one sub-block; a is the width of a sub-block; c is the length of the sub-block; D is the depth of a longitudinal or a transverse groove; d is the depth of a sub-groove; e is the distance from the center line through the area of contact with the ground to a sub-block; and T is one half the width of the area of the tread in contact with the ground.

The other object of the invention can be attained by a studless tire whose tread has blocks that are defined by longitudinal and transverse grooves, wherein recesses are formed in the buttress portion which extends radially inward from the tread end of shoulder blocks arranged in each shoulder portion and that, with the tire being installed on a normal rim and inflated, $\beta/\alpha=0.05–0.15$ and $\gamma/\delta=0.1–0.3$, in which the letter $\alpha$ represents the area of the triangle defined by the vertical line extending radially from the tread end of a tire section as taken along a plane including the tire's rotating axle, the slope line of the buttress portion and by the straight line parallel to the rotating axle at distance A, which is a quarter of the tire's height H, from the straight line drawn parallel to the rotating axle from the outer peripheral edge of the tire, letter $\beta$ represents the cross-sectional area of each of the recesses, letter $\gamma$ represents the area of the opening in each of the recesses, and letter $\delta$ represents the area of the buttress portion, and that the angle $\theta$ the vertical line extending radially from the tread end forms with the slope line of each buttress portion is set to lie within the range from 10 to 40 degrees.

The sub-blocks provided in the invention contribute not only to improve the running performance of the tire on snow- or ice-covered road surfaces but also to increase the lateral rigidity of the tread pattern by a sufficient amount to prevent skidding and increase the cornering limit speed while, at the same time, those sub-blocks insure that the vehicle, if it skids, can be easily corrected in attitude, thereby enhancing its maneuverability.

Without any sub-blocks in one pitch of the tread pattern, only insufficient anti-skid effect is provided by the portion of one pitch and the anti-skid effect achieved in the peripheral direction of the tire becomes so uneven that the stability of a vehicle running on snow- or ice-covered road surfaces is affected adversely.

If L/S is smaller than 0.5/0.5 (=1), the land area L is excessively small and, hence, the blocks are so small that their rigidity decreases, thereby reducing the grip force on the road surface. If L/S is greater than 0.65/0.35 (=65/35), the sea area S is excessively small and, hence, the grooves are too narrow to form adequate amount of snow ridges during running on the snow surface, whereby the force of friction between the tire and the road surface decreases so much as to deteriorate its running performance on the snow surface.

If m/M is smaller than 0.025, the individual inner or outer sub-blocks are so small that their lateral rigidity is insufficient to achieve the intended improvement in maneuverability.

If m/M is greater than 0.050, the individual inner or outer sub-blocks are so large that they will deform in only small amounts, thereby producing reduced anti-skid effect.

If a/c is smaller than 0.055, the sub-blocks are so narrow that their rigidity becomes insufficient. If a/c is greater than 0.15, the sub-blocks will deform in only small amounts, thereby achieving reduced anti-skid effect.

If d/D is smaller than 0.40, the sub-grooves are so shallow that they achieve only small effect as grooves. If d/D is greater than 0.80, the sub-grooves are so deep that the rigidity of the sub-blocks will decrease.

The recesses provided in the buttress portions of the shoulder blocks reduce the rigidity of the latter and absorb the impact that develops when the tread ends in square shoulders contact ruts, thereby contributing to prevent "wandering".

In addition, the lateral force that is applied to the shoulder portion on the outer side of each front wheel on a cornering vehicle is effectively absorbed to prevent the skidding of front wheels while suppressing the occurrence of understeer.

The values of $\beta/\alpha$ and $\gamma/\delta$ preferably lie within the ranges from 0.05 to 0.15 and from 0.1 to 0.3, respectively. If the lower limits of the respective ranges are not reached, the intended effects of the invention are not achieved. If the higher limits are exceeded, not only is the grip force reduced but also an additional problem such as the trapping of air occurs during tire manufacture.

DETAILED DESCRIPTION OF THE PREFERRED EMBODIMENTS

Embodiments of the invention are described below with reference to the accompanying drawings.

Figure 1:
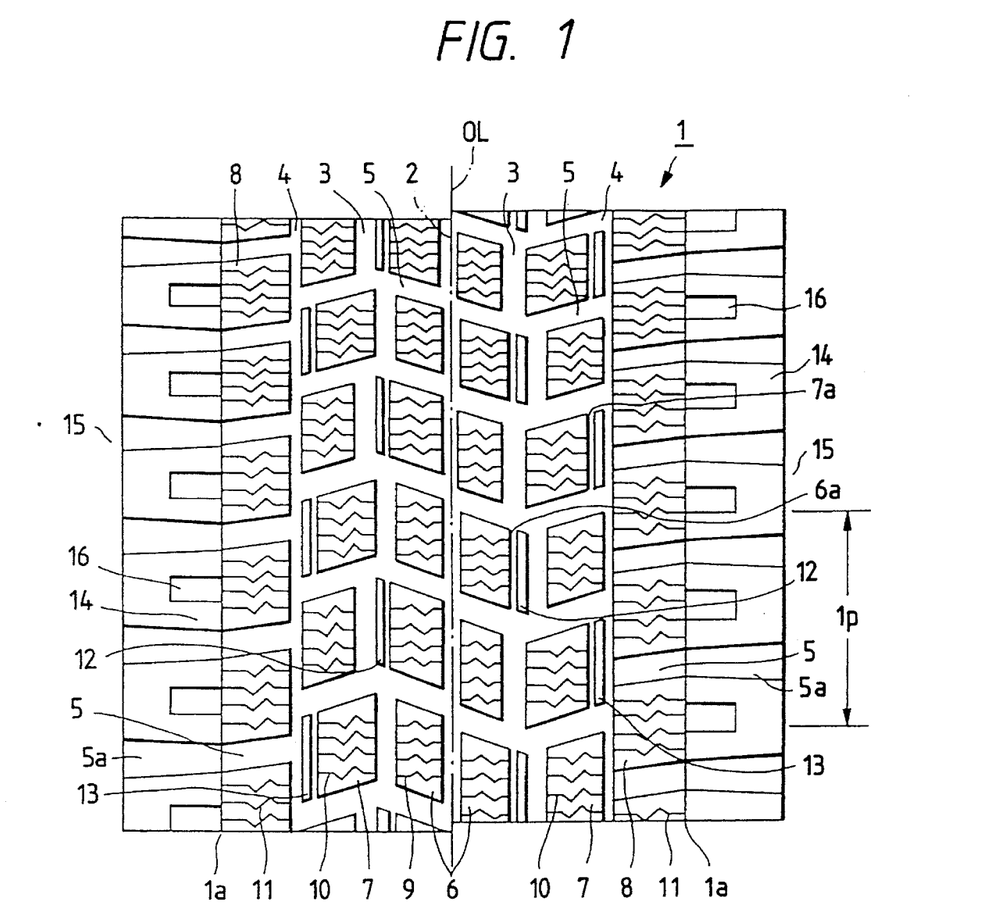
FIG. 1 shows a studless tire according to an embodiment of the present invention, with the tread being rendered in a flat form.
Figure 2:
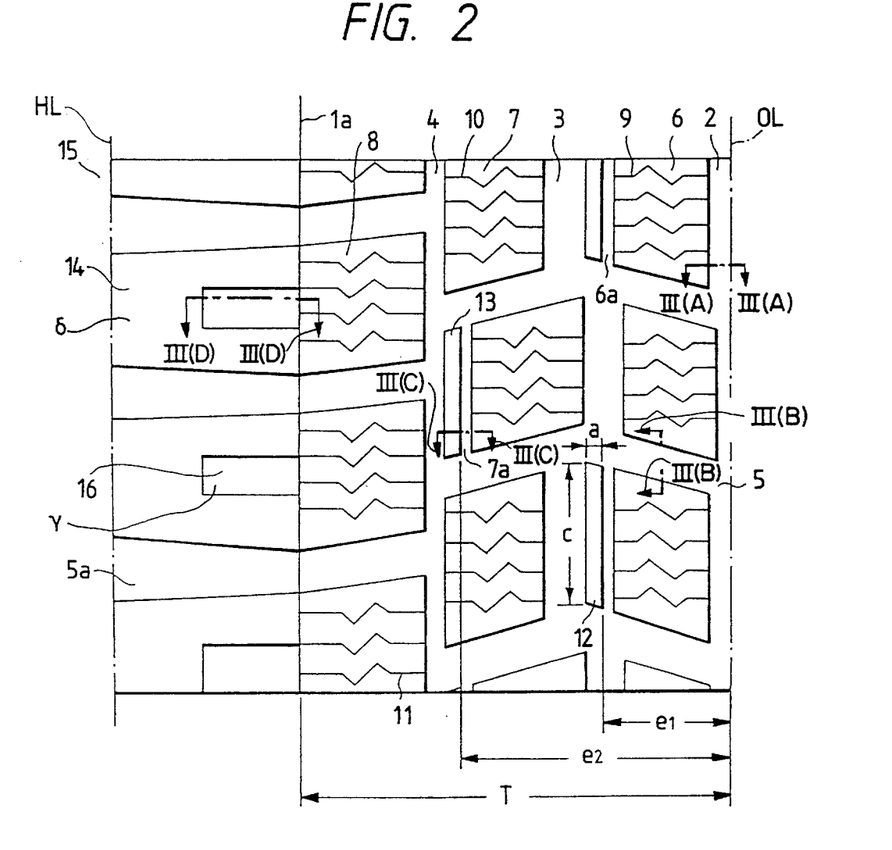
FIG. 2 shows partially enlarged the tread in FIG. 1.

As shown in FIGS. 1 and 2, a tread 1 has in the equatorial plane a center longitudinal groove 2 that extends in the peripheral direction of the tire. An intermediate longitudinal groove 3 and an outer longitudinal groove 4 are provided on either side of the center longitudinal groove 2. Transverse grooves 5 are provided in such a way that they extend from one tread end 1a to the other tread end 1a in the width direction of the tire. The center longitudinal groove 2, intermediate longitudinal grooves 3 and transverse grooves 5 define inner blocks 6; the intermediate longitudinal grooves 3, outer longitudinal grooves 4 and transverse grooves 5 define outer blocks 7; and the outer longitudinal grooves 4, tread ends 1a and transverse grooves 5 define shoulder blocks 8.

It should be noted that the intermediate longitudinal grooves 3 do not lie in one line in the peripheral direction but are staggered in the width direction; hence, at the crossings of the intermediate longitudinal grooves 3 and transverse grooves 5, the edges of inner blocks 6 and outer blocks 7 are not positioned in straight lines in the peripheral direction but are offset from each other, whereby enhanced edge bite into the snow or ice surface is provided to insure better grip performance.

Each inner block 6 has sipes 9 provided in such a way that their opposite ends communicate with the center longitudinal groove 2 and the intermediate longitudinal groove 3; each outer block 7 has sipes 10 provided in such a way that their opposite ends communicate with the intermediate longitudinal groove 3 and the outer longitudinal groove 4; each shoulder block 8 has sipes 11 provided in such a way that their opposite ends communicate with the outer longitudinal groove 4 and the tread end 1a. The number of sipes to be provided in each block is typically three to five (four in the embodiment under consideration) and no other sipes or cuts need be provided.

These sipes increase the area of contact between the block and snow or ice surfaces to provide better grip on snow- or ice-covered road surfaces. Further, they produce a snow or ice plowing effect to provide better traction on snow- or ice-covered road surfaces. In addition, communicating the sipes with the longitudinal grooves contributes a marked improvement in these effects of the sipes.

If each of the blocks 6, 7 and 8 has less than three sipes, the rigidity of the blocks is too high to improve the running performance on snow- or ice-covered road surfaces. If the number of sipes exceeds five, the rigidity of the blocks drops so much as to adversely affect the maneuverability of the tire, particularly on dry roads.

To secure these effects more positively, it is desired that the sipes extend over distances longer than the blocks in the axial direction. In the embodiment under consideration, this is achieved by forming a wavy pattern in the central portion of each sipe.

Figure 4:
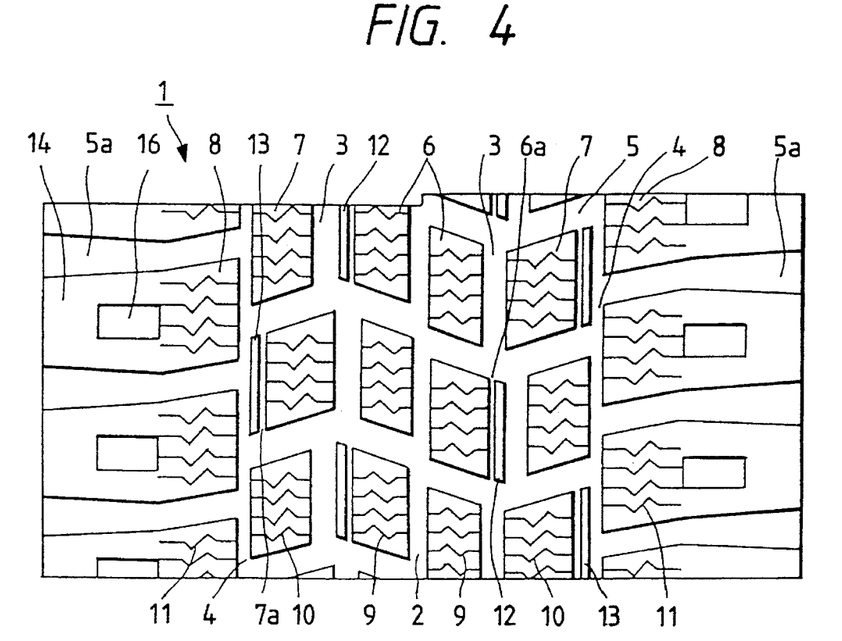
FIG. 4 shows the studless tire of Example and that of Comparative Example 1, with the tread being rendered in a flat form.

Every other block in each peripheral row of inner blocks 6 (or outer blocks 7) is provided with an anti-skid inner sub-block 12 (or outer sub-block 13) outward in the direction of the tire's rotating axle, as spaced by a sub-groove 6a (or 7a) that is formed to be less deep than grooves 2, 3, 4 and 5 (see FIG. 4). The inner sub-block 12 (or outer sub-block 13) has the longer side in the peripheral direction and the shorter side in the direction of the rotating axle. Each inner sub-block 12 is offset from adjacent outer sub-block 13 in the peripheral direction by a distance corresponding to one block.

It should be particularly mentioned that as regards the peripheral rows of inner blocks 6 provided on opposite sides of the center line OL through the area of contact with the ground, the inner sub-blocks 12 spaced by equal distances from the center line OL alternate in the peripheral direction. Similarly, as regards the peripheral row of outer blocks 7 provided on both sides of the center line OL through the ground contact area, the outer sub-blocks 13 spaced by equal distances from the center line OL alternate in the peripheral direction.

These inner sub-blocks 12 and outer sub-blocks 13 contribute not only to improve the running performance of the tire on snow- or ice-covered road surfaces but also to increase the lateral rigidity of the tread pattern by a sufficient amount to prevent skidding and increase the cornering limit speed while, at the same time, those sub-blocks insure that the vehicle, if it skids, can be easily corrected in attitude, thereby enhancing its maneuverability.

The tread end 1a of each shoulder block 8 is connected to a buttress portion 14 which extends to either side portion 15 of the tire, and recesses 16 are provided in the buttress portion 14. The recesses 16 lower the rigidity of shoulder blocks 8 so as to prevent not only "wandering" during running on the pavement of highways in a bare condition but also understeer when the vehicle corners.

It is recommended that in the ground contact area between the tread end 1a on one side and the tread end 1a on the other side, the ratio of the land area L, which is the total sum of the surface areas of all blocks 6, 7, 8, 12 and 13 on the entire circumference of the tire, to the sea area S which is the total sum of the areas of the openings in all grooves 2, 3, 4, 5, 6a and 7a, should be in the range L/S=(0.5–0.65)/(0.5–0.35), provided that the total area of contact with the ground is expressed by L+S=1.

If L/S is smaller than 0.5/0.5=1, the land area L is excessively small and, hence, the blocks are so small that their rigidity decreases, thereby reducing the grip force on the road surface. If L/S is greater than 0.65/0.35 (=65/35), the sea area S is excessively small and, hence, the grooves are too narrow to form adequate amounts of snow ridges during running on the snow surface, whereby the force of friction between the tire and the road surface decreases so much as to deteriorate its running performance on the snow surface.

It is also recommended that if the in-pitch land area which is the sum of the surface areas of blocks 6, 7, 8, 12 and 13 within one pitch of the tread pattern is expressed by M and the surface area of one inner sub-block 12 or one outer sub-block 13 by m, the ratio of m to M should be set to lie within the range m/M=0.025–0.050.

If m/M is smaller than 0.025, either the inner sub-blocks 12 or the outer sub-blocks 13 are so small that their lateral rigidity is insufficient to insure the intended improvement in maneuverability.

If m/M is greater than 0.050, the inner sub-blocks 12 or the outer sub-blocks 13 are so large that they will deform in only small amounts, thereby producing reduced anti-skid effect.

It is also desirable that the ratio of the width a of each of inner sub-block 12 and outer sub-block 13 to its length c be set within the range a/c=0.055–0.15. If a/c is smaller than 0.055, sub-blocks 12 and 13 are so narrow that their rigidity is insufficient. If a/c is greater than 0.15, both sub-blocks 12 and 13 will deform in only small amounts, producing reduced anti-skid effect.

A further recommendation is that d/D range from 0.40 to 0.80, with D representing the depth of each of the grooves 2, 3, 4 and 5, and d representing the depth of each of the sub-grooves 6a and 7a. If d/D is smaller than 0.40, the sub-grooves 6a and 7a are too shallow to work effectively as grooves. If d/D is greater than 0.80, the sub-grooves 6a and 7a are so deep that the rigidity of inner sub-blocks 12 and outer sub-blocks 13 will decrease.

It is essential for the purposes of the present invention that at least one inner sub-block 12 and at least one outer sub-block 13 be provided within one pitch of the tread pattern.

Without any sub-blocks within one pitch of the tread pattern whether they are inner sub-blocks 12 or outer sub-blocks 13, only insufficient anti-skid effect is provided by the portion of one pitch and the anti-skid effect achieved in the peripheral direction of the tire becomes so uneven that the stability of a vehicle running on snow- or ice-covered road surfaces is affected adversely.

It is also advisable in the present invention that if the distance from the center line OL through the ground contacting area of the tread 1 to the ridgeline of inner sub-block 12 closer to the center of the ground contact area is expressed by $e_1$ whereas the distance from the center line OL to the ridgeline of outer sub-block 13 closer to the center of the ground contact area is expressed by $e_2$, the inner sub-blocks 12 and the outer sub-blocks 13 should be provided in a region that satisfies the condition 0.2<e/T<0.8, where e stands for $e_1$ or $e_2$ and T is one half the width of the ground contact area which is equal to the distance between tread ends 1a on opposite sides of the tire.

If e/T is equal to or smaller than 0.2, the inner sub-blocks 6 decrease in width in the direction of the tire's rotating axle and their rigidity will also decrease to cause adverse effects on tire performance characteristics such as traction performance and the stability of running on snow- or ice-covered road surfaces.

If e/T is equal to or greater than 0.8, the shoulder blocks 8 decrease in width in the direction of the tire's rotating axle and their rigidity will also decrease, again adversely affecting tire performance characteristics such as traction performance and the stability of running on snow- or ice-covered road surfaces.

Invention tire sample (Example 1; see FIG. 4), three comparative tire samples (Comparative Examples 1 to 3) that had sub-blocks but which were structurally outside the scope of the invention in one or more aspects, and one other comparative tire sample (Comparative Example 4) having a prior art structure were tested for their performance. The test results, as well as the specifications of the respective tire samples are shown in Tables 1 and 2.

The tire of Comparative Example 1 (see FIG. 4) was outside the scope of the invention only in terms of d/D (=0.34<0.40, the lower limit of the range specified by the invention).

Figure 5:
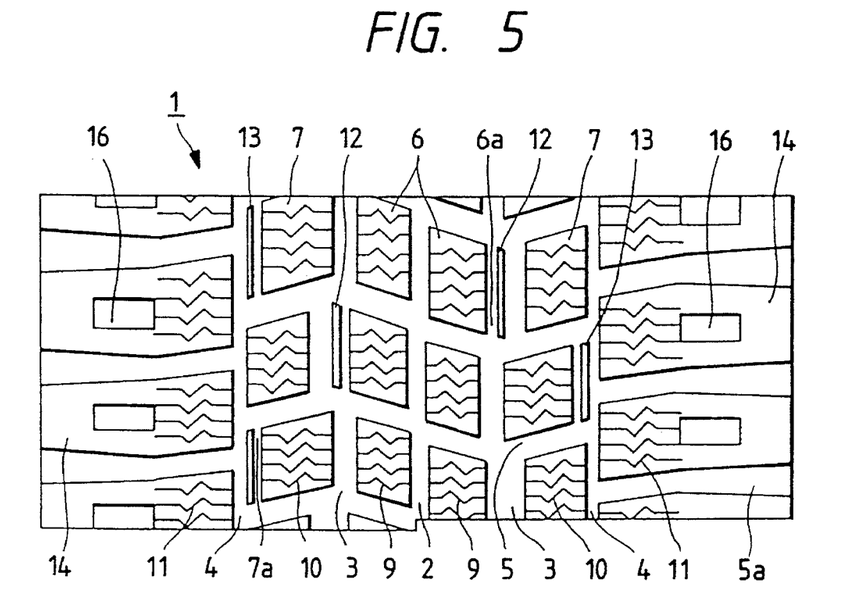
FIG. 5 shows the studless tire of Comparative Example 2, with the tread being rendered in a flat form.

The tire of Comparative Example 2 (see FIG. 5) was outside the scope of the invention in terms of m/M (=0.0145<0.025, the lower limit of the range specified by the invention) and a/c (0.050<0.055, the lower limit of the range specified by the invention).

Figure 6:
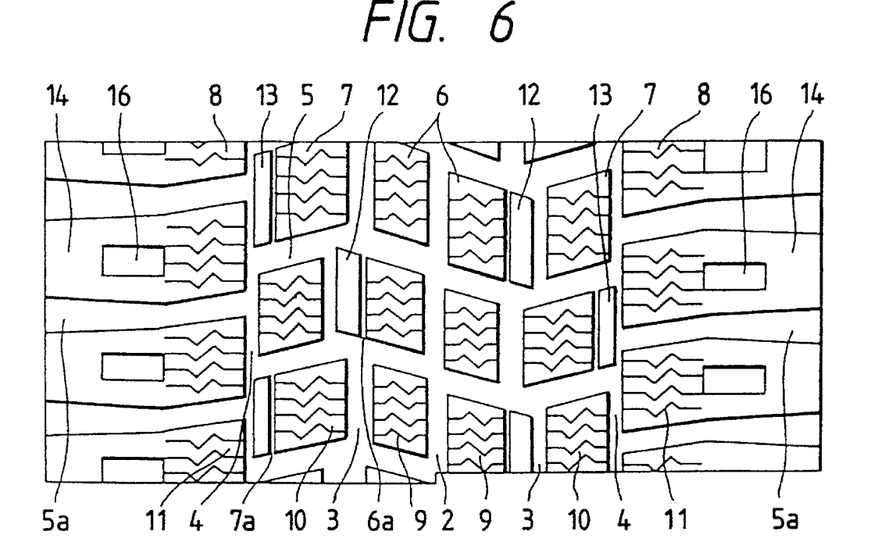
FIG. 6 shows studless tire of Comparative Example 3, with the tread being rendered in a flat form.

The tire of Comparative Example 3 (see FIG. 6) was also outside the scope of the invention in terms of m/M (=0.058>0.050, the upper limit of the range specified by the invention) and a/c (=0.200>0.15, the upper limit of the range specified by the invention).

Figure 7:
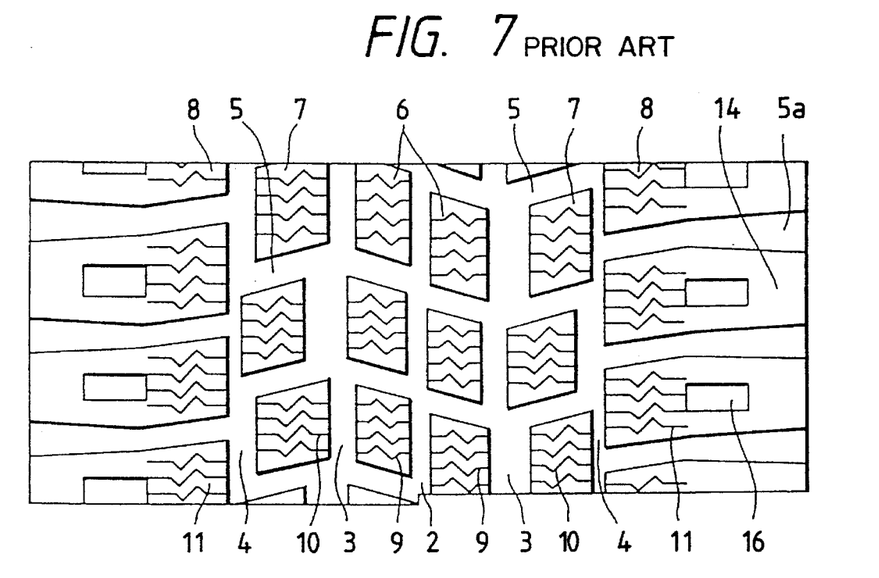
FIG. 7 shows the studless tire of Comparative Example 4, with the tread being rendered in a flat form.

The tire of Comparative Example 4 (see FIG. 7) had a conventional tread pattern absent inner and outer sub-blocks.

As for the running performance data given by indices in Tables 1 and 2, the criteria are the data in Comparative Example 4 and the higher the indices, the better the performance.

TABLE 1

|  | Example 1 | Comparative Example 1 | Comparative Example 2 |
|---|---|---|---|
| L/S | 0.58/0.42 | 0.58/0.42 | 0.56/0.44 |
| m/M | 0.029 | 0.029 | 0.0145 |
| a/c | 0.100 | 0.100 | 0.050 |
| d/D | 0.588 | 0.34 | 0.588 |
| No. of sub-blocks within one pitch | 2 | 2 | 2 |
| (e/T) $e_1/T$ | 0.27 | 0.27 | 0.29 |
| $e_2/T$ | 0.62 | 0.62 | 0.64 |
| (Performance on the ice) | | | |
| Index of cornering performance | 105 | 102 | 102 |
| Index of slalom time | 106 | 102 | 101 |
| (Performance on the snow) | | | |
| Time to pass handling track (seconds) | 98.09 | 101.34 | 102.22 |
| Speed of cornering at R = 35 m (km/h) | 32.6 | 31.2 | 31.1 |
| Rating for stability during lane change | 7 | 6 | 6 |
| Controllability after skidding | 8 | 7 | 6 |

TABLE 2

|  | Comparative Example 3 | Comparative Example 4 |
|---|---|---|
| L/S | 0.60/0.40 | 0.55/0.45 |
| m/M | 0.058 | — |
| a/c | 0.200 | — |
| d/D | 0.588 | — |
| No. of sub-blocks within one pitch | 2 | — |
| (e/T) $e_1/T$ | 0.25 | — |
| $e_2/T$ | 0.60 | — |
| (Performance on the ice) | | |
| Index of cornering performance | 101 | 100 |
| Index of slalom time | 103 | 100 |
| (Performance on the snow) | | |
| Time to pass handling track (seconds) | 101.87 | 103.40 |
| Speed of cornering at R = 35 m (km/h) | 30.9 | 29.3 |
| Rating for stability during lane change | 7 | 5 |
| Controllability after skidding | 5 | 5 |

As one can see from Tables 1 and 2, the provision of sub-blocks according to claim 1 contributed improvements in tire's performance on both the ice and the snow; it should particularly be noted that by providing sub-blocks that satisfied the requirements according to the present invention, the performance on the ice and the snow, especially cornering performance, could be further improved.

Having the structural features described herein, the studless tire of the invention has the following advantages.

The provision of sub-blocks contributes not only to improve the running performance of the tire on snow- or ice-covered road surfaces but also to increase the lateral rigidity of the tread pattern by a sufficient amount to prevent skidding and increase the cornering limit speed while, at the same time, those sub-blocks insure that the vehicle, if it skids, can be easily corrected in attitude, thereby enhancing its maneuverability.

Without any sub-blocks in one pitch of the tread pattern, only insufficient anti-skid effect is provided by the portion of one pitch and the anti-skid effect achieved in the peripheral direction of the tire becomes so uneven that the stability of a vehicle running on snow- or ice-covered road surfaces is affected adversely.

If L/S is smaller than 0.5/0.5 (=1), the land area L is excessively small and, hence, the blocks are so small that their rigidity decreases, thereby reducing the grip force on snow- or ice-covered road surfaces. If L/S is greater than 0.65/0.35 (65/35), the sea area S is excessively small and, hence, the grooves are too narrow to form adequate amounts of snow ridges during running on the snow surface, whereby the force of friction between the tire and the road surface decreases so much as to deteriorate its running performance on the snow surface.

If m/M is smaller than 0.025, the individual inner or outer sub-blocks are so small that their lateral rigidity is insufficient to achieve the intended improvement in maneuverability on snow- or ice-covered road surfaces.

If m/M is greater than 0.050, the individual inner or outer sub-blocks are so large that they will deform in only small amounts, thereby producing reduced anti-skid effect on snow- or ice-covered road surfaces.

If a/c is smaller than 0.055, the sub-blocks are so narrow that their rigidity becomes insufficient. If a/c is greater than 0.15, the sub-blocks will deform in only small amounts, thereby achieving reduced anti-skid effect on snow- or ice-covered road surfaces.

If d/D is smaller than 0.40, the sub-grooves are so shallow that they achieve only small effect as grooves. If d/D is greater than 0.80, the sub-grooves are so deep that the rigidity of the sub-blocks will decrease.

Another embodiment of the invention are described below with reference to the accompanying drawings.

Figure 3A:
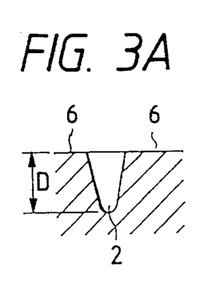
FIG. 3A is section III(A)—III(A) of FIG. 2.
Figure 3B:
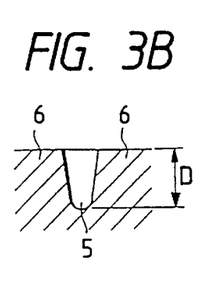
FIG. 3B is section III(B)—III(B) of FIG. 2.
Figures 3C, 3D:
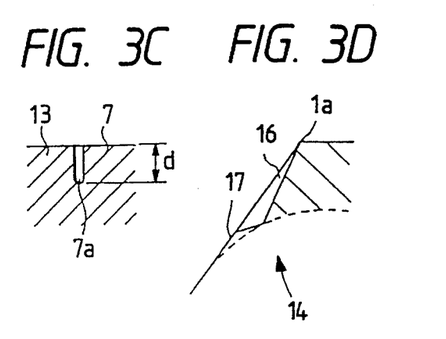
FIG. 3C is section III(C)—III(C) of FIG. 2.
FIG. 3D is section III(D)—III(D) of FIG. 2.
Figure 8:
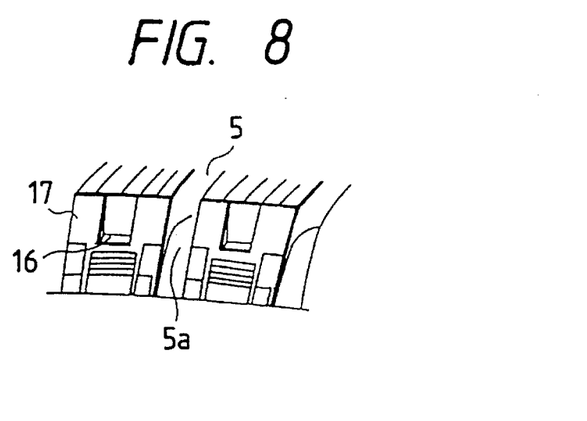
FIG. 8 is a perspective view of the buttress portion on one side of the studless tire embodying the concept of the present invention.

In a studless tire as shown in FIGS. 1 and 2, the tread end 1a of each shoulder block 8 is connected to a buttress portion 14 which extends to either side portion 15 of the tire, and recesses 16 are provided in the buttress portion 14 (see FIGS. 3 and 8).

Figure 9:
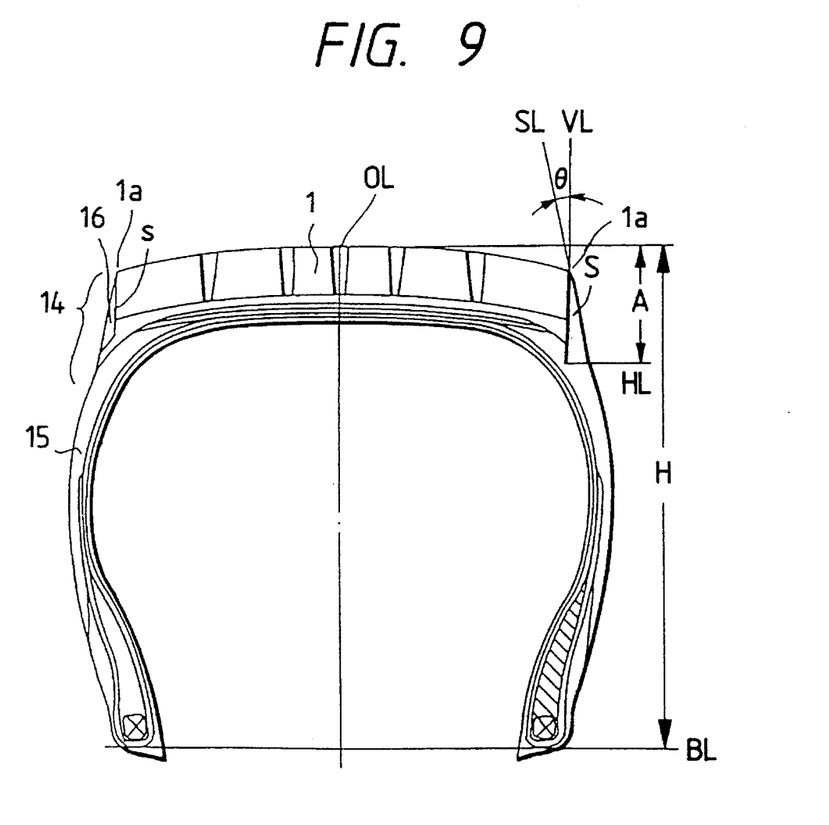
FIG. 9 is a partial cross section of the studless tire shown in FIG. 1.

As shown in FIG. 9, the angle θ of the vertical line VL extending radially from the tread end 1a of an inflated tire forms with the slope line SL of the buttress portion 14 is set to range from 10 to 40 degrees (θ=32° in the embodiment under consideration).

Consider triangle S that is formed by the vertical line VL, the slope line SL, and straight line HL that is parallel to the rotating axle of the tire at distance A (A=H/4) from the straight line drawn parallel to the rotating axle from the outer peripheral edge of tire OL, with H being the height of tire as defined by the distance from the baseline BL (the reference plane of the rim) to OL. Also consider the cross section s (triangular in the embodiment) of each recess 16 in the buttress portion 14 as taken along a plane including the rotating axle. If the areas of triangle S and cross section s are written as α and β, respectively, it is necessary that β/α range from 0.05 to 0.15 (β/α=0.13 in the embodiment).

The recesses 16 lower the rigidity of shoulder blocks 8 so as to prevent "wandering" and understeer.

If β/α is smaller than 0.05, the recesses 16 are too small to achieve the intended effects; if β/α is greater than 0.15, not only the grip force decreases but also problems such as the trapping of air occur during tire manufacture.

Let assume the area of the opening in each recess 16 to be written as γ (see FIG. 2); also assume that the area of the shoulder block 8 that is surrounded by the slope line of the buttress surface 17 (including the area of the opening in recess 16) has area δ. According to the invention, γ/δ is specified to range from 0.1 to 0.3 (γ/δ=0.21 in the embodiment), and the angle θ the vertical line extending radially from the tread side end forms with the slope line of the buttress portion is set to range from 10 to 40 degrees.

These conditions are necessary to provide better running characteristics on highways in a bare condition such as cornering performance and stability during running in ruts. If γ/δ is smaller than 0.1, recesses 16 are too small to achieve the intended effects; if γ/δ is greater than 0.3, not only the grip force decreases but also problems such as the trapping of air occur during tire manufacture.

Tire samples were constructed in accordance with the present invention and tested for their performance in comparison with a conventional tire. The test results are shown in Tables 3 and 4.

Figure 10A:
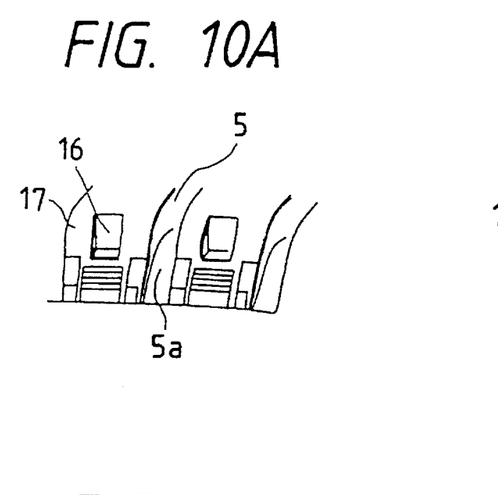
FIGS. 10A to 10D show in perspective four different configurations of the buttress portion according to the invention.

First invention tire sample (Example 2) did not have any sipes in the blocks in the direction of the tire's rotating axle and the recesses 16 in the buttress portions 14 had a triangular cross section (see FIG. 10A).

Figure 10B:
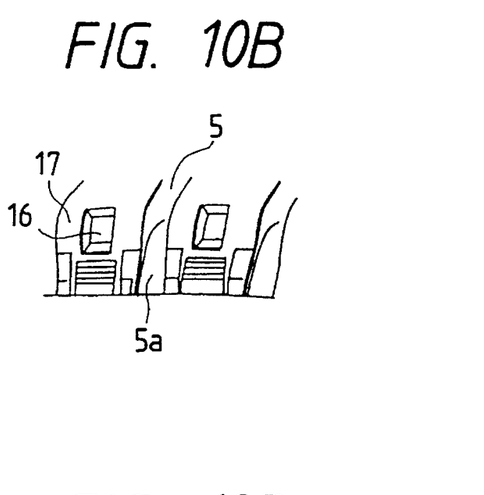

Second invention tire sample (Example 3) did not have any sipes in the blocks in the direction of the tire's rotating axle and the recesses 16 had a rectangular cross section (see FIG. 10B).

Third invention tire sample (Example 4) had sipes in the blocks in the direction of the tire's rotating axle and the recesses 16 had a triangular cross section (see the embodiment described in preceding paragraphs).

Figure 10C:
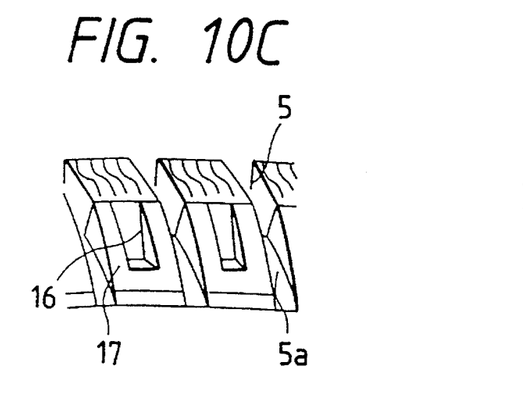

Fourth invention tire sample (Example 5) had sipes in the blocks in the direction of the tire's rotating axle and the recesses 16 had a triangular cross section (see FIG. 10C).

Figure 10D:
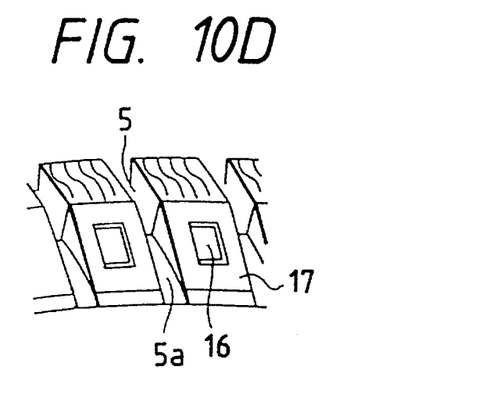

Fifth invention tire sample (Example 6) had sipes in the blocks in the direction of the tire's rotating axle and the recesses 16 had a rectangular cross section (see FIG. 10D).

Figure 10E:
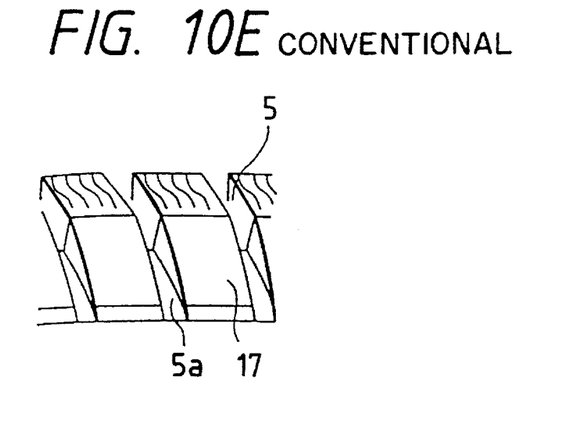
FIG. 10E shows one configuration of the buttress portion of a conventional studless tire.

The conventional tire as a comparative sample (Comparative Example 5) had sipes in the blocks in the tire's rotating axle but the buttress portions 14 did not have any recesses (see FIG. 10E).

TABLE 3

|  | Example 2 | Example 3 | Example 4 |
|---|---|---|---|
| β/α | 0.078 | 0.18 | 0.13 |
| γ/δ | 0.17 | 0.17 | 0.21 |
| θ | 17° | 17° | 32° |
| Performance on highways in bare condition |  |  |  |
| (stability during straight run) | 7 | 7 | 7 |
| (stability during lane change) | 8 | 6 | 7 |
| (cornering performance) | 7 | 6 | 8 |
| Handling track running time | 63.21 | 67.01 | 62.54 |
| Running along ruts |  |  |  |
| (in ruts) | 8 | 7 | 8 |
| (escape from ruts) | 7 | 6 | 8 |
| Performance on the snow or ice surface |  |  |  |
| (braking on snow) | 102 | 102 | 103 |
| (braking on ice) | 104 | 101 | 100 |
| (cornering on ice; R = 25 m) | 105 | 102 | 100 |

TABLE 4

|  | Example 5 | Example 6 | Comparative Example 5 |
|---|---|---|---|
| β/α | 0.13 | 0.042 | — |
| γ/δ | 0.34 | 0.21 | — |
| θ | 32° | 32° | 32° |
| Performance on highways in bare condition |  |  |  |
| (stability during straight run) | 7 | 6 | 6 |
| (stability during lane change) | 6 | 6 | 5 |
| (cornering performance) | 6 | 6 | 5 |
| Handling track running time | 65.89 | 67.01 | 68.70 |
| Running along ruts |  |  |  |
| (in ruts) | 7 | 7 | 6 |
| (escape from ruts) | 7 | 6 | 6 |
| Performance on the snow or ice surface |  |  |  |
| (braking on snow) | 102 | 100 | 100 |
| (braking on ice) | 101 | 101 | 100 |
| (cornering on ice; R = 25 m) | 102 | 100 | 100 |

As one can see from Tables 3 and 4, the invention tire samples had better performance on highways in a bare condition than the comparative sample without deterioration in the running performance on snow- or ice-covered road surfaces.

Having the structural features described herein, the studless tire of the invention has the following advantages.

The recesses provided in the buttress portions of the shoulder blocks reduce the rigidity of the latter and absorb the impact that develops when the tread ends in square shoulders contact ruts, thereby contributing to prevent "wandering".

In addition, the lateral force that is applied to the shoulder portion on the outer side of each front wheel on a cornering vehicle is effectively absorbed to prevent the skidding of front wheels while suppressing the occurrence of understeer.

What is claimed is:

1. A studless tire with a tread pattern comprising a plurality of longitudinal grooves and a plurality of transverse grooves which define at least two rows of blocks that extend in the peripheral direction of the tire, the two rows of blocks being separated by a center line of the tire;

wherein said plurality of longitudinal grooves includes one longitudinal groove and another longitudinal groove, each of said one and another longitudinal grooves having first portions and second portions such that the first portions and the second portions alternate and the first portions are offset from the second portions in the direction of the rotating axis, wherein each of said blocks has a plurality of sipes extending from one side of the block to an opposite side of the block, the one side being substantially parallel to the peripheral direction, wherein every other block in each of the two rows is separated from an axially outward sub-block by a sub-groove which is disposed between adjacent first portions of a respective longitudinal groove, each said sub-block having no sipe therein, each said sub-groove being less deep than said longitudinal grooves and transverse grooves, each said sub-block having longer side in the peripheral direction, said longer side being substantially parallel to the peripheral direction of the tire, and a shorter side in the direction of the rotating axis, and wherein said sub-blocks are spaced at a predetermined distance from said center line and alternate in the peripheral direction.

2. The studless tire according to claim 1 wherein said studless tire satisfies following conditions:

$$0.5/0.5 \leq L/S \leq 0.65/0.35;$$

and $$L+S=1;$$

where L designates a land area in the ground contact area between the axial tread ends of the total surface areas of all said blocks and sub-blocks, and S designates a sea area in the ground contact area between the axial tread ends of the total openings areas of all said grooves and sub-grooves.

3. The studless tire according to claim 2 which further satisfies the following conditions:

$$0.025 \leq m/M \leq 0.050;$$

$$0.055 \leq a/c \leq 0.15;$$

$$0.40 \leq d/D \leq 0.80;$$

and $$0.2 < e/T < 0.8,$$

where M is the in-pitch land area of all said blocks and sub-blocks within one pitch of the tread pattern; m is the surface area of one of said sub-blocks; a is the width of said one of said sub-blocks; c is the length of said one of said sub-blocks; D is the depth of one of said longitudinal and transverse grooves; d is the depth of one of said sub-grooves; e is the distance from the center line to said one of said sub-blocks; and T is one half the width of the distance between the axial tread ends.

4. The studless tire according to claim 1 which further satisfies the following conditions:

$$0.025 \leq m/M \leq 0.050;$$

$$0.055 \leq a/c \leq 0.15;$$

$$0.40 \leq d/D \leq 0.80;$$

and $$0.2 < e/T < 0.8,$$

where M is the in-pitch land area of all said blocks and sub-blocks within one pitch of the tread pattern; m is the surface area of one of said sub-blocks; a is the width of said one of said sub-blocks; c is the length of said one of said sub-blocks; D is the depth of one of said longitudinal and transverse grooves; d is the depth of one of said sub-grooves; e is the distance from the center line to said one of said sub-blocks; and T is one half the width of the distance between the axial tread ends.

* * * * *